UNITED STATES PATENT OFFICE.

JASPER HENRY SELWYN, OF LONDON, COUNTY OF MIDDLESEX, ENGLAND.

HYDRO-METALLURGICAL METHOD OF EXTRACTING METALS.

SPECIFICATION forming part of Letters Patent No. 412,300, dated October 8, 1889.

Application filed March 24, 1888. Serial No. 268,408. (No specimens.)

*To all whom it may concern:*

Be it known that I, JASPER HENRY SELWYN, a subject of the Queen of Great Britain, residing at London, in the county of Middlesex, in Great Britain aforesaid, have invented certain new and useful Improvements in Hydro-Metallurgical Methods of Extracting Metals, &c., from their Ores; and I do declare the following to be a full, clear, and exact description of the invention, such as will enable others skilled in the art to which it appertains to make and use the same.

My invention relates to a new and useful improvement in the humid method of extracting metals, metalloids, and other valuable substances from their ores.

The object of my invention is to extract metals, metalloids, and other valuable substances from their ores by the use of new chemical combinations, enabling me in the majority of cases to dispense with all preliminary roasting of what are called "refractory ores."

My invention consists, therefore, in subjecting the ore in a requisite state of division to the action of monochloride or dichloride of sulphur in combination—whether the same be applied together or successively—with a solution of common salt, hydrochloric acid, sodic hyposulphite, or any other well-known solvent or solvents, by which the soluble salts formed may be taken up and retained in solution from the moment of their formation, or, as it has been defined, in their nascent state.

I do not claim the use of any of the solvents alone, as has already been practiced in humid metallurgy; but what I claim to be new and useful is the combination or successive action as above, which enables the process to be practically and successfully applied on the large scale.

In a great majority of cases where the humid or hydro-metallurgical processes are applicable a preliminary treatment by fire, called "roasting," is necessary, and the same thing is true in the other processes, called "amalgamation" and "smelting," only in the latter to a much greater extent.

Now, there exists the following objections to the roasting of ores: First, the great cost of the plant both at the outset and for its maintenance; second, the skilled labor necessary for its success, and, third, the time required, and other expenses of such a preparatory treatment.

My invention obviates the necessity of any such roasting of most of the varieties of refractory ores, however base they may be, and treats them as they exist naturally in the lodes, without any attempt at preparation other than a simple crushing or mechanical subdivision of them by any convenient method.

My invention not only avoids roasting generally, but reduces or separates the metals and the sulphur and the chlorine, so that all may be returned in a merchantable condition after treatment by the most simple means.

My invention is applicable to all classes of ores which do not carry a high percentage of lead, and by my method all metals whose chlorides are soluble may be extracted, though the precious metals are mainly sought for by reason of their greater value.

In carrying out my invention the various steps of the process may be described, generally, as follows: The ore is first reduced to the needful degree of subdivision, the extent of which is to be determined by the nature of the ore and the metals, metalloids, or other valuable substances sought to be extracted. Ordinarily the ore, after comminution, is charged or run into a tank or tanks, which may be of any material capable of resisting the action of the chemicals to be used, and retaining the solution at whatever temperature is required in or during the process without loss by leakage or absorption. These tanks or vats may be provided with the ordinary false bottoms or filtering-beds and with covers or hoods, in order that pressure may be had upon the surface of the ore or liquor to hasten filtration and that the escaping gases may be collected. I then add to and digest the mass with one or more solutions containing a greater or less percentage, according to circumstances, of a liquid known to chemists and variously called "sulphurous chloride," "monochloride," or "dichloride" of sulphur; or I may first digest with this chemical alone, and then add the simple solutions or solvents of the metals, or proceed in any other way, so that the combination may be effected as desired. The reaction which at once follows the introduction of monochloride or dichloride of sulphur is the evolution of heat and the formation of the soluble chlorides of the metals, the separation of native sulphur, and the production of chlorine gas. The different solutions for retaining the soluble chlorides may be used either consecutively or together with the monochloride or dichloride of sulphur; but I consider the combination of their action to be essential to economy and success. The soluble chlorides are thus dissolved as soon as they are formed, and the resulting liquors are separated from the ore residuum by the ordinary method of filtration after a certain time of treatment, which cannot be the same for all ores, but is very rapid.

The steps of the process as applied to some particular ore are shown in its application to, for example, energyte, which is one of the most intractable ores known in California; but this treatment should not be taken as a guide to the treatment of a totally different ore, though less refractory. Different ores require somewhat different treatment. This is treated as described in the foregoing specification, and is boiled for about three hours in a solution composed of ten per cent. of monochloride or dichloride of sulphur, in combination with a saturated solution of salt and five per cent. of hydrochloric acid. This ore has been selected as an example, because its treatment by the old humid process has, at least in some localities, been abandoned on account of the heavy expense involved, and my new method above described can be substituted therefor with great economy. Coincident with the formation of the soluble chlorides of the metals is the separation of pure sulphur which floats about in the digesting mass and gradually collects on the surface or top of the liquor, from whence it may be skimmed off, and at the same time chlorine gas is freed and collects in the upper part of the tank or vat, whence it may be conveyed to an appropriate reservoir. In this manner the elements of the monochloride or dichloride of sulphur which I use to act upon ores by my process are recovered and may be utilized for the manufacture of monochloride or dichloride of sulphur in the manner which is well understood to chemists. The different metals contained in the filtrated liquor are then precipitated and recovered by any of the well-known means, preferably by the use of electric currents generated by dynamos, each in its own tank or vat, the liquor passing on to the different vats in succession, to be in each vat deprived of a certain metal which remains behind as a precipitate. These precipitates are afterward reduced by the ordinary processes, as melting or otherwise, to a merchantable condition, and the solutions can afterward be restored to their original state by the necessary addition of other chemicals—such as lime-water—to commence anew their hydro-metallurgical course through the ore contained in the tanks or vats.

At high elevations and in certain cases steam heat will be useful, and care must always be taken that no such gases are evolved or combinations made possible as would lead to the redeposition of the metals in the ore under treatment. This would arise if metals be used in the construction of the vats not properly protected from the action of the solvents, or in some cases from the generation of gaseous products which act as precipitants—such as sulphureted hydrogen—owing to the ill-selected solvents for the particular ore.

The operation should always be conducted as nearly as may be at a boiling temperature in the ore-vats.

Heretofore in the ordinary method of extracting metals and other valuable substances from their ores, the sulphur has been driven off as a gas, and in some cases has been condensed and collected, but more commonly thrown into the air, and then existing as sulphurous or sulphuric acid been a great nuisance to the neighborhood. By my process the sulphur appears as free sulphur floating in the boiling solution above the ore as an immediate consequence of the chemical changes involved in the process, and has only to be collected by skimming. This may be done by any ordinary means, but preferably by non-metallic strainers. The sulphur can then be melted and purified in the ordinary manner, if desired.

The collection of the gases arising from the above-mentioned process, principally chlorine and sulphurous acid, is not only to avoid the unpleasant and unhealthy effects of their free escape, but also that they may be utilized in the reformation of the original chemical upon which this process is based and so assist in making it remunerative and self-supporting, for the production of these gases is as much a consequence of the reactions upon the ore as the formation of the soluble chlorides of the metals. As soon as these gaseous products make their appearance, which will be immediately after the introduction of the solution into the ore, or vice versa, the hoods previously suspended above the boiling-vats are lowered into contact with the vats, having first been luted to form a close joint. The collection of the gases then proceeds automatically until the charge is exhausted and no further evolution of gas takes place.

Having thus described my invention, what I claim, and desire to protect by Letters Patent, is—

1. The hydro-metallurgical process of separating sulphur and metals from their combinations, which consists in subjecting the pulverized materials to the action of chloride of sulphur for the purpose of separating the sulphur and forming the soluble chlorides of the metals and simultaneously or subsequently subjecting the charge to solvents of the metallic salts, as and for the purposes described.

2. In the hydro-metallurgical process of separating sulphur and metals from their combinations, which consists in subjecting the pulverized materials to the action of chloride of sulphur for the purpose of separating the sulphur and forming the soluble chlorides of the metals and simultaneously or subsequently subjecting the charge to solvents of the metallic salts, the final recovery of the chlorine and sulphurous acid gases evolved, as and for the purposes described.

In testimony whereof I affix my signature in presence of two witnesses.

JASPER HENRY SELWYN.

Witnesses:
W. T. MARSHALL,
I. TOWNSEND THOMPSON.